United States Patent [19]

Scott et al.

[11] 4,335,281
[45] Jun. 15, 1982

[54] POST-AURICLE CONTOURED HEADSET FOR TWO-WAY VOICE COMMUNICATION

[75] Inventors: Charles G. Scott, Aptos; James B. Robertson, Soquel; Robert L. Harris, Aptos, all of Calif.

[73] Assignee: Plantronics, Inc., Santa Cruz, Calif.

[21] Appl. No.: 162,634

[22] Filed: Jun. 24, 1980

[51] Int. Cl.³ .............................................. H04M 1/04
[52] U.S. Cl. ................................................ 179/156 A
[58] Field of Search .......... 179/156 R, 156 A, 107 H, 179/107 S, 179; D24/35

[56] References Cited

U.S. PATENT DOCUMENTS

| | | | |
|---|---|---|---|
| D. 199,125 | 9/1964 | Flygstad et al. | D26/14 |
| D. 218,173 | 7/1970 | Hutchings | D26/14 |
| 2,882,348 | 4/1959 | Erickson | 179/107 |
| 2,975,244 | 3/1961 | Lehr | 179/156 R |
| 3,209,080 | 9/1965 | Guttner et al. | 179/107 |
| 3,280,273 | 10/1966 | Flygstad et al. | 179/156 |
| 3,548,118 | 12/1970 | Hutchings | 179/156 |

FOREIGN PATENT DOCUMENTS 1044027  9/1966  United Kingdom .......... 179/107 H

OTHER PUBLICATIONS

"Instructions–How to Use Your New Model R-70 Operator's Headset", (Publ., #PN3972? no date) Roanwell Corp., 180 Varick St., N.Y. N.Y.

"Instructions–How to Use Your New Model R-71 Operator's Headset", (Publ. #PN3974? no date) Roanwell Corp., 180 Varick St., New York, N.Y.

*Primary Examiner*—George G. Stellar
*Attorney, Agent, or Firm*—Arnold, White & Durkee

[57] ABSTRACT

A miniaturized headset of the post-auricle type is disclosed. The headset microphone may be located in the capsule, or at the end of a swivelable boom near the wearer's mouth. In either case, the headset capsule is contoured to fit over the mastoid process of the skull, in order to provide better weight distribution, comfort and stability. The headset capsule is further contoured by providing a front-to-back concavity in the upper portions of the capsule's sides, so as to generally conform to the curvature of the wearer's head.

6 Claims, 7 Drawing Figures

POST-AURICLE CONTOURED HEADSET FOR TWO-WAY VOICE COMMUNICATION

FIELD OF THE INVENTION

This invention relates to headsets for two-way voice communication, such as might be used by telephone operators, aircraft pilots, air-traffic controllers, etc.

BACKGROUND OF THE INVENTION

It has long been known that headsets for two-way voice communication can advantageously be constructed from small, lightweight components, such that the overall weight of the headset may be on the order of one ounce. For example, U.S. Pat. No. 3,184,556, issued May 18, 1965, to W. K. Larkin, discloses a miniaturized headset wherein a hearing-aid size microphone transducer and a similarly miniaturized transducer are placed in a capsule mounted near the user's ear; speech is conducted to the microphone via an acoustic tube positioned near the user's mouth, while incoming communications emanating from the receiver are conducted to the user's ear via a second acoustic tube. Larkin-type headsets have been used with either a light headband or the temple bar of an eyeglass frame as the supporting member for the transducer housing.

In order to eliminate the necessity for having a headband or an eyeglass frame to support the transducer housing, various headsets have employed the so-called "post-auricle" configuration, wherein the transducers are placed in a capsule which is mounted behind the ear of the user, and is shaped to fit generally along the saddle area behind the ear. For example, U.S. Pat. No. 3,548,118, issued Dec. 15, 1970, to K. J. Hutchings, discloses such a post-auricle arrangement, with an acoustic voice tube passing over the ear and into the headset capsule, and an acoustic ear tube passing from the capsule under the wearer's ear and up into the ear canal. The arrangement disclosed in the Hutchings patent is embodied in a headset commercially sold by Plantronics, Inc., the assignee of the present application, under its trademark "StarSet."

It has also been known to provide a headset having a capsule shape generally similar to that disclosed in the above-identified Hutchings patent, but not employing an acoustic voice tube. Instead, an electret-type microphone is mounted at the end of a swivelable boom, so that it can be positioned near the wearer's mouth. The boom is hollow, and electrical lead wires are passed from the electret microphone through the boom and into the headset capsule, where they are incorporated into the main headset cable, which in turn is plugged into a switchboard or other means of connecton to a telephone line. An example of this boomelectret microphone arrangement is found in the headset commercially offered by Northern Electric Company under its trademark "Venture."

The aforementioned headset designs, and all other post-auricle headset designs known to applicants, have attempted to provide stability by means of the judicious location of the acoustic voice tube or boom; or by means of the anchoring effect of the acoustic ear tube; or by attempting to make the saddle curvature of the headset capsule fit as many human ears as possible. Until the present invention, shaping of other portions of the headset capsule was limited to efforts to contain the transducers adequately, and to make the top-most portion of the capsule as thin as possible, thereby to provide adequate mounting space for the headset to pass over the top of the ear, where the distance between the auricle and the skull is usually small, especially if the user is wearing eyeglasses.

Headset design is primarily a subjective human engineering problem, with very few workable theoretical guide lines. Proposed designs generally need to be tried out on many differnt people of varying heights, weights, ages, head shapes, etc., to determine their reactions with regard to comfort, stability, and acoustic properties.

SUMMARY OF THE INVENTION

Applicants have found that a substantial enhancement to stability of a post-auricle headset is obtained by certain contouring of the side surfaces of the headset capsule. Strictly speaking, it is necessary to shape only one side of the capsule, but for purposes of versatility, it is desirable to shape both sides, so that the headset can conveniently be worn on either side of the head.

One advantageous type of capsule contouring has been found by applicants to be related to the bony protrusion of the skull known as the mastoid process. Headset stability is enhanced by tapering the lower portion of the capsule sides, so that the capsule rests on the mastoid process, thereby minimizing pressure points and more widely distributing the weight of the capsule and the slight pull of the line cable. In addition to providing greater stability, this shaping results in a capsule of a given weight feeling ligher to the user, and being more comfortable to wear for long periods.

Another advantageous type of headset capsule shaping has been found to be the provision of some concavity at the top of the capsule, so as to approximately shape the capsule to the curvature of the skull. Fitting the capsule to the skull enhances stability by providing a greater contact surface between the headset and the wearer's head.

Comfort and stability are especially enhanced by the incorporation of both of the above contouring features into the capsule design.

An application filed concurrently herewith by Robert J. Bernardi, entitled "Post-Auricle Headset with Electret Microphone," relates to the use of an electret microphone in a post-auricle headset.

BRIEF DESCRIPTION OF THE DRAWINGS

The invention may be better understood by reference to the drawings, in which.

DESCRIPTION OF THE PREFERRED EMBODIMENTS

Figure 1:
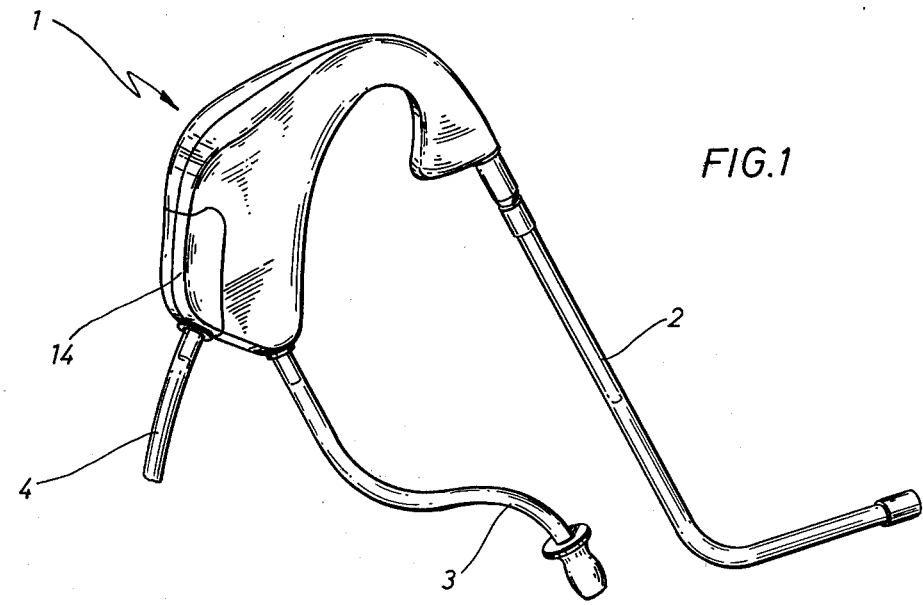
FIG. 1 is a pictorial view of a headset according to the present invention.

Referring now to FIG. 1 of the drawings, a headset is shown, including a post-auricle capsule 1. The capsule contains a receiver transducer for reception of electrical signals via wires in cable 4 and conversion of these signals to sound by a receiver transducer. The receiver's sound signals are conveyed by acoustic tube 3 to the wearer's ear canal. The headset capsule 1 may also contain a microphone transducer for converting voice signals to electrical signals, which are then conveyed by means of wires in cable 4 to a suitable amplification device, and thence onto a telephone line, or other communication link. Voice signals are conveyed to the microphone transducer via acoustic tube 2, which is swivelably positioned near the wearer's mouth.

Alternatively, in the boom microphone arrangement described above, the microphone transducer might be located at the end of tube 2, which would then not function as an acoustic tube, but rather as a conduit tube for one or more lead wires from the boom microphone into the headset capsule. The tube might itself function as a lead or as a ground return, if made of conductive metal. The capsule 1 includes a removable cover portion 14, to facilitate repair work on the headset if required.

Figure 4:
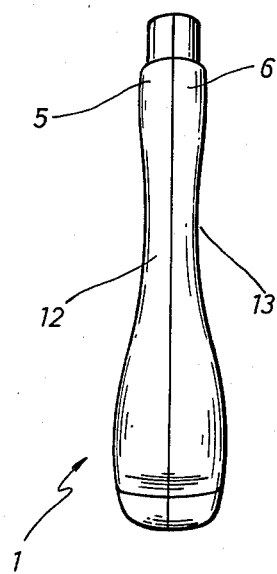
FIG. 4 is a top view of a headset capsule according to the present invention, showing outward concavity of the side portions, to conform to the curvature of the skull.
Figure 2:
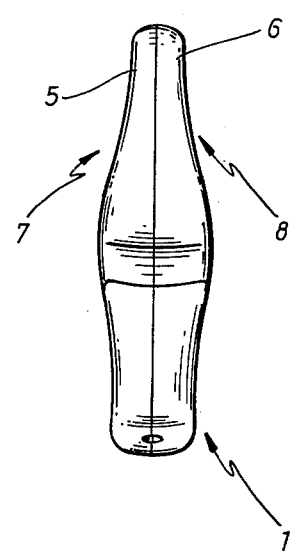
FIG. 2 is a rear view of a headset capsule according to the present invention, showing the tapering of the capsule to fit over and rest upon the mastoid process.
Figure 3:
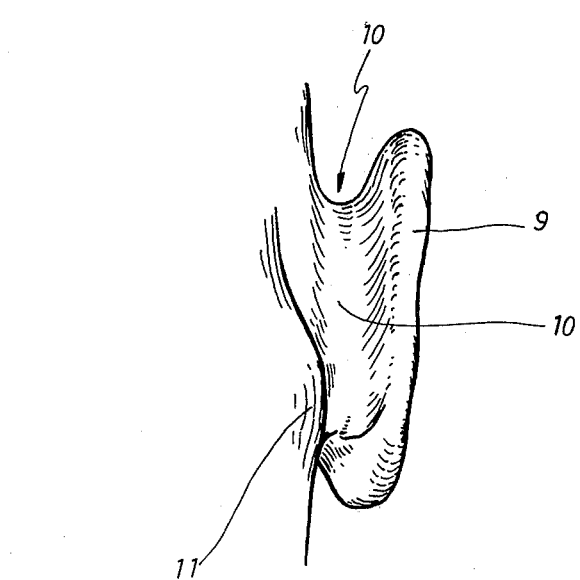
FIG. 3 is a view of the post-auricle area of a typical human head, showing the mastoid process.

As shown in FIGS. 2 and 4 of the drawings, the headset capsule is comprised of two mating halves 5 and 6. When viewed from the rear, as in FIG. 2, it is seen that the sides of the headset capsule are not plane, but are contoured. Contoured portions 7 and 8 are designed to make the capsule narrower toward the bottom. This contouring of the lower side surfaces of the capsule is done to take account of the shape of the human skull in the area behind the ear. More particularly, as shown in FIG. 3, there is a bony protrusion behind the ear known as the mastoid process, shown at 11. In the present invention, it has been found that better fit, comfort and stability are obtained if the sides of the headset capsule are contoured to fit over the mastoid process 11. Of course, the capsule must also have a curved portion to fit the saddle area 10 behind the auricle 9, as known in the prior art.

Another aspect of capsule shaping according to the present invention is to contour the upper side portions of headset capsule 1 to the curvature of the skull in a fore-and-aft direction. As illustrated in FIG. 4, this curvature of the upper side portions is shown, viewed from above, by the outwardly concave surfaces 12 and 13. This curvature is exaggerated in FIG. 4 for clarity; in actuality, the curvature of the head in the area near the top of the ear is somewhat less than as shown in FIG. 4. It has been found that wearer comfort and stability are further enhanced by shaping the capsule to this curvature of the head.

Figure 5:
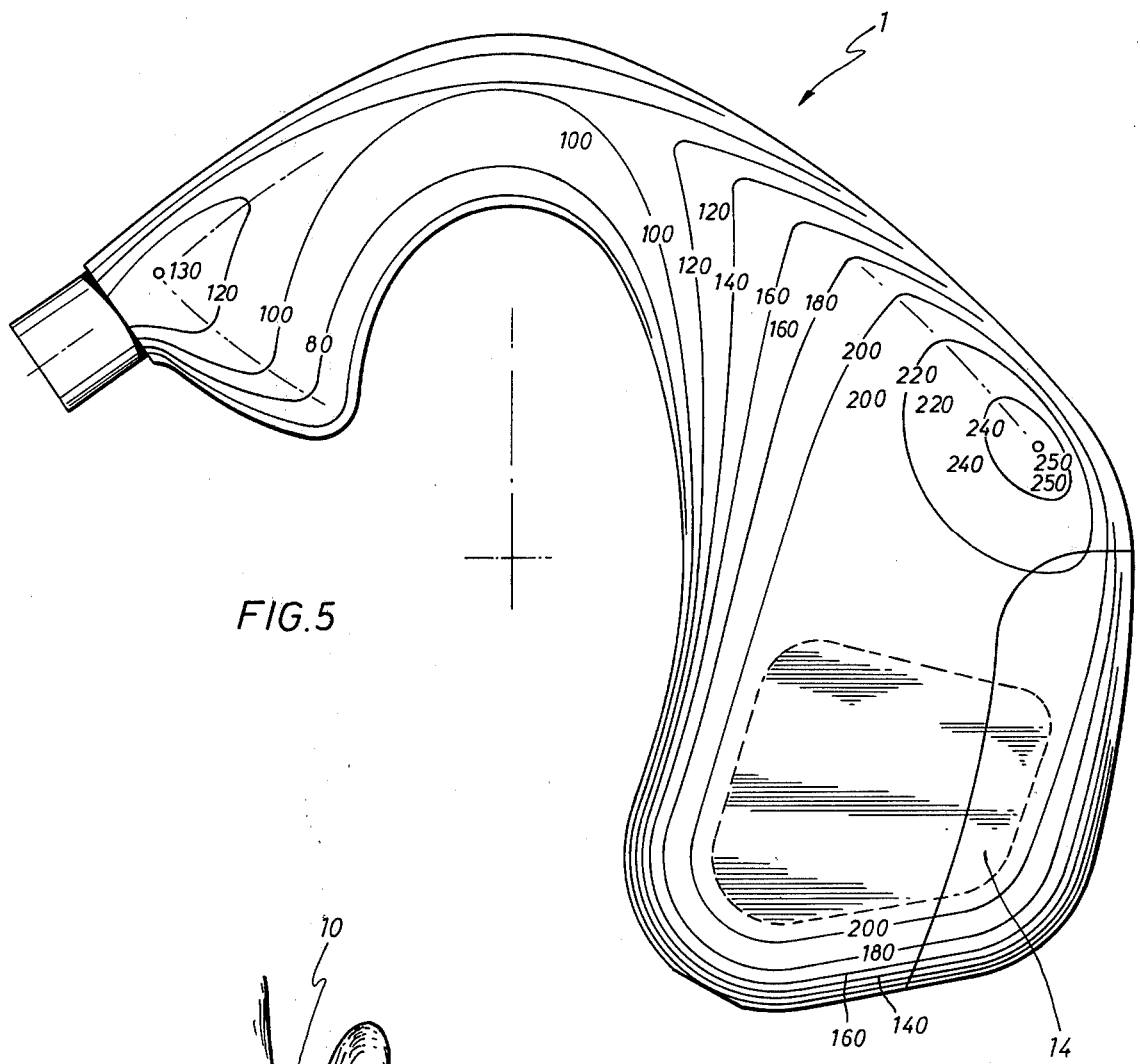
FIG. 5 is a contour drawing, showing the preferred dimensions for shaping a headset capsule according to the present invention.

Referring now to FIG. 5 of the drawings, a contour drawing of a headset capsule according to the present invention is shown. The dimensions shown are in mils, measured from the line dividing the left and right halves of the capsule (see FIGS. 2 and 4). The contouring to fit the mastoid process is shown in FIG. 5 by the area wherein the thickness of a capsule half decreases from 250 mils to 200 mils. Although it would be possible to broaden the lower portion of the capsule once it has passed below the mastoid process, and still be within the scope of the present invention, it is preferable not to do so, because of the variable length and location of the mastoid process among various prospective wearers.

During use, the headset is partially supported on the mastoid process, thereby dividing and distributing the weight of the capsule and the slight pull of the headset cable 4 between the mastoid process 11 (FIG. 3) and the saddle area 10 of the ear.

Figure 6:
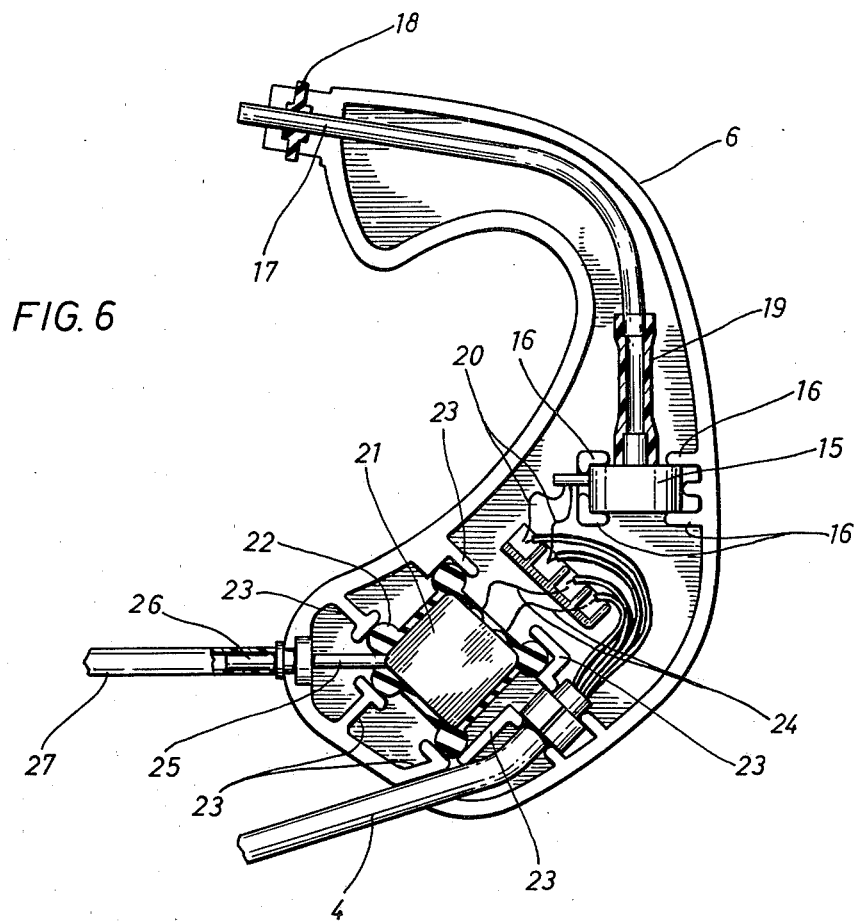
FIG. 6 is an illustration of the post-auricle headset capsule according to the present invention, and including an electret microphone.

Referring now to FIG. 6 of the drawings, when the microphone of the headset is to be located in the headset capsule, it is advantageous to use a microphone of the electret type. An electret microphone operates on the principle of converting sound into changes of electrical field between a metallic diaphragm and a metal back plate, which operate together as a capacitor. FIG. 6 shows a typical arrangement of such a headset, in which an electret microphone 15 is seated in a capsule half 6 by means of ribs 16, which may be molded integrally with the capsule-half 6. Sound is conducted to the electret microphone 15 by way of tube 17, which may be of stainless steel. Tube 17 is surrounded by a wire retainer 18 welded to tube 17 where it enters the capsule. Tube 17 is press-fitted to an elastomeric coupler 19, the other end of which is press-fitted onto the electret microphone 15. Lead wires 20 are provided to connect electret microphone 15 to wires of the headset cable 4. A suitable voice tube arrangement, not shown, may be employed to pick up sound near the wearer's mouth and convey it into tube 17, thus comprising an acoustic voice tube assembly.

A magnetic or dynamic receiver 21 is fitted in a rubber boot 22, which in turn is placed in the headset capsule half, in the space formed between ribs 23. Leads 24 are employed to conduct electrical signals from wires in the headset cable 4 to the receiver 21. An elastomeric coupler 25 connects the receiver 21 to a metal receiver insert 26, which passes through the capsule wall. An acoustic ear tube, partially shown at 27, conducts sound from the metal receiver insert 26 to the wearer's ear canal, in conventional manner, thus constituting an acoustic receiver tube assembly.

Figure 7:
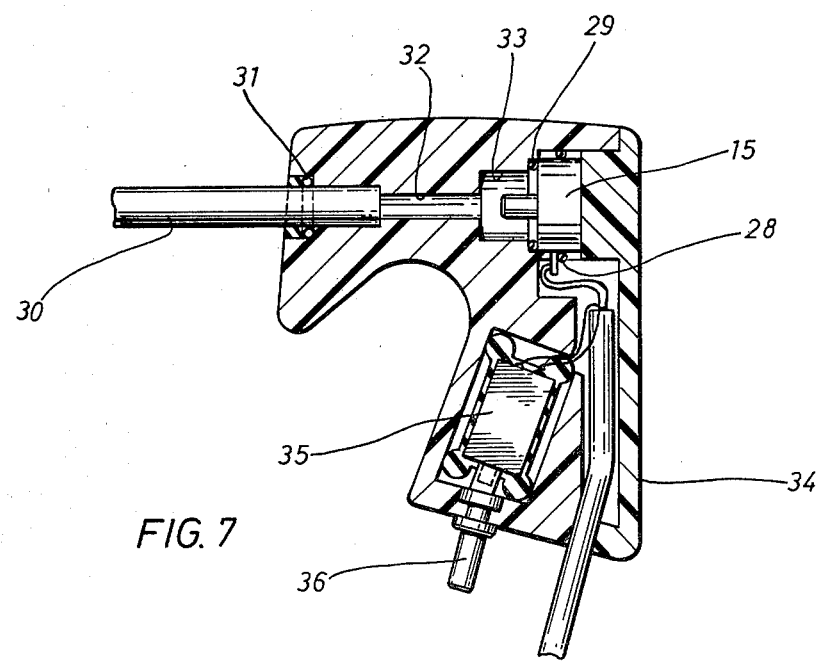
FIG. 7 is a cross-sectional view of an alternative post-auricle headset capsule configuration including an electret microphone.

An alternative arrangement for mounting the electret microphone in a headset capsule is shown in FIG. 7 of the drawings. This arrangement is substantially similar to that of FIG. 6, except that a first O-ring 28, of suitable elastomeric material, is placed around the main casing of electret microphone 15, to allow cushioning for the microphone if the headset is subjected to jarring in either the vertical direction or the transverse direction. A second O-ring 29 is placed in front of the casing of electret microphone 15, to allow for lateral cushioning of the microphone in case the headset is subjected to jarring in the lateral direction.

In the arrangement of FIG. 7, sound is conducted to the electret microphone 15 by way of an acoustic tube 30, which is surrounded by a third elastomeric O-ring 31 where it enters the capsule. Acoustic tube 30 ends at passageway 32, through which sound is conducted to cavity 33, where it is picked up by the electret microphone 15. A magnetic or dynamic receiver 35 is mounted in the capsule 34 in a manner similar to that described for the arrangement of FIG. 6. Sound is conducted from magnetic receiver 35 via a receiver-insert 36 to an acoustic ear tube, not shown.

It should be understood that various alternatives to the structures shown herein may be employed in practicing the present invention. It is intended that the following claims define the invention, and that structure within the scope of these claims and their equivalents be covered thereby.

What is claimed is:

1. A two-way voice communication headset, comprising:
   (a) a post-auricle housing;
   (b) means, including a microphone, for converting the wearer's speech to electrical signals, said means being connected to said housing;
   (c) means, including a receiver, for converting received electrical signals into sounds and conveying said sounds to the wearer's ear, said means being connected to said housing;
   said housing having a lower portion narrowed on both sides, said narrowed portion being adapted to fit adjacent the mastoid process on either side of the wearer's head.

2. The headset of claim 1, wherein at least a portion of the sides of said headset housing are concave outward, to conform to the curvature of the wearer's head in the front-to-back direction.

3. A two-way voice communication headset, comprising:
   (a) a post-auricle capsule containing a microphone and a receiver;
   (b) an acoustic voice tube connected to said microphone, said voice tube having an open end positionable near the wearer's mouth;
   (c) an acoustic ear tube having one end thereof connected to said receiver, the other end thereof adapted for insertion into the wearer's ear;
   said headset capsule having a lower portion narrowed on both sides, said narrowed lower portion being adapted to fit adjacent the mastoid process on either side of the wearer's head.

4. The headset of claim 3, wherein at least a portion of the sides of said headset capsule are concave outward, to conform to the curvature of the wearer's head in the front-to-back direction.

5. A two-way voice communication headset, comprising:
   (a) a post-auricle capsule containing a receiver;
   (b) a boom extending from said capsule;
   (c) a microphone mounted on the end of said boom away from said capsule;
   (d) an acoustic ear tube having one end connected to said receiver, the other end thereof adapted for insertion into the wearer's ear;
   said headset capsule having a lower portion narrowed on both sides, said narrowed lower portion being adapted to fit adjacent the mastoid process on either side of the wearer's head.

6. The headset of claim 5, wherein at least a portion of the sides of said headset capsule are concave outward, to conform to the curvature of the wearer's head in the front-to-back direction.

* * * * *